United States Patent Office 3,642,751
Patented Feb. 15, 1972

3,642,751
ACYL AZO COMPOUNDS AS POLYMERISATION CATALYSTS
Heino Logemann, Leverkusen, Walter Meckel, Dusseldorf, and Erwin Muller, Leverkusen, Germany, assignors to Farbenfabriken Bayer Aktiengesellschaft, Leverkusen, Germany
No Drawing. Filed July 14, 1969, Ser. No. 841,554
Claims priority, application Germany, July 30, 1968,
P 17 95 015.1
Int. Cl. C08f 3/64, 3/66, 15/18
U.S. Cl. 260—89.5         5 Claims

ABSTRACT OF THE DISCLOSURE

Catalysts for the polymerisation of vinyl- and divinyl compounds containing as an active ingredient an acyl azo compound.

---

Aliphatic azo compounds $$R-N=N-R'$$

are known catalysts for initiating radicals homo- or copolymerisation of vinyl or divinyl compounds. In the formula, R and R' represent an alkyl, a cycloalkyl or an aralkyl radical, the alkyl radicals being substituted, if desired, with, for example, hydroxyl, carboxyl, nitrile, sulphonic acid or tertiary amino groups. Cyclic azo compounds in which the N=N group forms part of a ring system have also been described as catalysts. The best known example of such polymerisation catalysts is azo bis-isobutyronitrile). In contrast to the peroxidic catalysts and redox systems which are customarily used no oxidative side reactions occur in the course of the polymerisation reaction are therefore often less discoloured and more stable to light. Unwanted cross-linking reactions are largely prevented so that polymers prepared from them often have better solubility properties. Furthermore, substances which would react with "per" compounds, for example certain dyes, can be added to the monomers before or during polymerisation.

It has now been found that acyl azo compounds of the formula:

$$X-C-N=N-Y$$
$$\parallel$$
$$O$$

are excellent catalysts for the polymerisation of vinyl and divinyl compounds.

In the formula
(a) X=R=a $C_1$–$C_6$ alkyl or phenyl group and

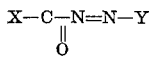

in which $R_1$ and $R_2$ each represents an alkyl radical with 1 to 6 carbon atoms or together represent a cycloalkyl radical with 4 to 8 carbon atoms;
(b) X=

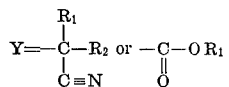

wherein $R_1$ and $R_2$ have the same meaning as in (a) and $n=1$ to 8.

The acyl azo compounds which are suitable as polymerisation catalysts can be divided into three groups:
(1) Compounds of the formula:

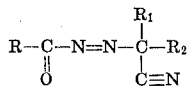

(2) Compounds of the formula:

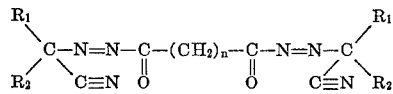

(3) Compounds of the formula:

$$R-C-N=N-C-O-R_1$$
$$\parallel \qquad\quad \parallel$$
$$O \qquad\quad\;\; O$$

The general radicals in these formulae have the same meaning as above.

One especially advantageous group of acyl azo compounds can be represented by the formula:

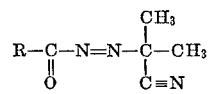

in which R represents a methyl or ethyl group. The acyl azo compounds of the above formulae are new. They can be prepared by oxidising the corresponding hydrazo compounds (prepared by the reaction of acyl hydrazides with ketone cyanohydrins or chloroformic acid esters) in an organic solvent, for example benzene, or in a water-solvent suspension at 0 t 40° C. with the calculated quantity of halogen, e.g., chlorine. After removal of the solvent by distillation, the products are obtained in approximately 80 to 90% yield in the form of yellowish red liquids or coloured crystals.

Examples of acyl azo compounds which are especially suitable for use as catalysts are acetyl-(2-cyanoisopropyl)-diazine, propionyl-(2-cyanoisopropyl)-diazine, acetyl-carbethoxy-diazine and benzoyl-carbethoxy-diazine.

The above-mentioned acyl azo compounds can be used for any polymerisation process, and can thus be used equally well for emulsion polymerisation as for polymerisation in bulk or in solution or in bead polymerisation, suspension polymerisation and precipitation polymerisation. The quantity used is generally 0.1 to 3% by weight based on the amount of monomers present. There is no restriction in principle on the choice of auxiliary agents used for the polymerisation, such as emulsifiers, dispersing agents and solvents, regulating agents and additives for adjusting the pH; in other words, any of the known auxiliary agents of this type may be used.

Divinyl compounds within the meaning of the present invention are, for example, conjugated dienes, preferably those with 4 to 8 carbon atoms such as butadiene, isoprene and chloroprene. Vinyl compounds are e.g. aliphatic and aromatic mono- and polyvinyl compounds such as vinyl acetate, vinyl chloride, vinylidene chloride, allyl esters, vinyl methyl ketones, fumaric acid esters, maleic acid esters, itaconic acid esters, styrene, chlorostyrenes, styrenes which are alkylated in the nucleus, divinyl benzenes and acrylic compounds such as acrylic acid, methacrylic acid and their esters, e.g. of $C_1$ to $C_{15}$ alcohols, acrylamide, methacrylamide, acrylonitrile, methacrylonitrile and methylene-bis-acrylamide.

These compounds may be homopolymerised or they may be copolymerised in any combinations and quantities. The acrylic compounds defined above are preferably used for the process.

The above-mentioned acyl azo compounds have an advantage over the known aliphatic alkyl azo compounds in that they have substantially higher activity as polymerisation catalysts. This is particularly the case when polymerising acrylic compounds such as acrylic acid esters, acrylonitrile, acrylic acid amide and its substitution products and when copolymerising these substances. The acyl azo compounds therefore enable polymerisation to be carried out under conditions of temperature and concentration at which peroxide-free radical polymerisation could not previously be achieved. Whereas the above-mentioned acyl azo compounds will remain unchanged for a long time at room temperature or at slightly lower temperatures, they decompose extremely rapidly in the presence of polymerisable monomers, especially in the presence of OH-containing solvents, to initiate the polymerisation reaction. It may therefore sometimes be advantageous, especially if polymerisation is to be carried out in a short time at temperatures above room temperature, to introduce the acyl azo compound in the form of a solution in a suitable diluent, e.g. in the monomer, during the polymerisation reaction. In this way, satisfactory polymerisation can be achieved with these compounds even at temperatures of 40 to 80° C. or more. On the other hand, polymerisation can also be achieved at temperatures substantially below zero with acyl azo compounds. It is advantageous to add heavy metal compounds, e.g. of iron and especially of copper to obtain additional acceleration. These compounds may, for example, be inorganic or organic salts and complex compounds of iron and copper. Examples of suitable compounds of this type are the chlorides, sulphates, acetyl acetonates and nitrile acetonates. The quantities used are preferably between 0.001 and 0.1% by weight, based on the monomers. Apart from the known methods of adjusting the pH, the addition of a strong acid such as toluene sulphonic acid may be an advantage. Furthermore, the polymerisation initiated by "per" compounds or by redox systems can be considerably accelerated and in some cases started by acyl azo compounds, especially at low temperatures, so that even greater acceleration can be achieved by such combinations. Activation of polymerisation by "per" compounds or redox systems is already known and has been described e.g. in Houben Weyl "Methoden der Organischen Chemie," vol. XIV/1, page 229 et seq.

Since the catalysts are generally strongly coloured, their presence can be detected by their colour even at relatively small concentrations and the rate at which they are used up can be determined. Residues of excess catalyst, which rarely occur, can always be made to disappear by subsequently increasing the temperature after polymerisation is completed and before the product is worked up, or by adding strong alkali.

When polymerisation is carried out by solution or precipitation polymerisation, any solvents which are inert to the monomers may, in principle, be used. Aliphatic and aromatic, if desired, halogenated hydrocarbons, alcohols, e.g. lower aliphatic alcohols such as methanol, ethanol and propanol, ketones such as acetone, ethers such as dioxane or tetrahydrofuran and dimethylformamide, dimethylsulphoxide and dimethylacetamide are preferred. Suspension or emulsion polymerisation is preferably carried out in water or in mixtures of water and solvents which are miscible with water, e.g. alcohols. If the solvent is composed entirely or partly of alcohols, decomposition of the catalysts according to the invention and hence polymerisation are considerably accelerated.

EXAMPLE 1

100 parts by weight of methyl acrylate are dissolved in 400 parts by volume of a mixture of methanol and water; prepared by mixing 25 volumes of methanol with 15 of water. In the presence of 1% of acetyl-(2-cyanoisopropyl)-diazine, based on the monomer, 22% of polymer which has a K-value according to H. Fikentscher (Cellulose Chemie 12 (1932) 60) of 116, measured in a 0.5% solution in dimethylformamide at 25° C., is obtained after 5 hours at −20° C. The addition of 0.002% of $CuSO_4 \cdot 5H_2O$, based on the monomer, results in an 86% yield of a product of K value 117, and 0.02% of $CuSO_4 \cdot 5H_2O$ results in a 99% yield of a product of K-value 91. When the same quantity of azo bis(isobutyronitrile) is used instead of acetyl-(2-cyanoisopropyl)-diazine, not the slightest trace of polymerisation can be achieved at −20° C. If 1% of acetyl-(2-cyanoisopropyl)-diazine is used together with 1% of ammonium persulphate, based on the monomer, 100% of polymer of K-value 138 is obtained after 5 hours at −20° C., and 100% of a polymer of K-value 120 is obtained under these conditions in the presence of an additional 0.002% of $CuSO_4 \cdot 5H_2O$, whereas when azo bis(isobutyronitrile) is used instead of the acetyl-(2-cyanoisopropyl)-diazine in the same reaction mixtures, or when ammonium persulphate is used alone, no polymerisation can be observed, the solutions remaining completely clear. When a small amount of polymer has been formed, it is obtained in the form of floccules, but later the entire product solidifies in the form of a white gel.

EXAMPLE 2

100 parts by weight of methyl acrylate are dissolved in 400 parts by volume of a mixture of methanol and water in the volumetric ratio of 25:15 in the presence of 0.02 part by weight of $CuSO_4 \cdot 5H_2O$. When using 1% of propionyl-(2-cyanoisopropyl)-diazine, 99% of a polymer of K-value 140, measured in a 0.5 solution in dimethylformamide at 25° C., is obtained after 5 hours at −20° C. 95% of a polymer of K-value 128 is obtained when using 1% of benzoyl-(2-cyanoisopropyl)-diazene and 97% of a polymer of K-value 131 is obtained when using 1% of adipoly-bis-(2-cyanoisopropyl)-diazene

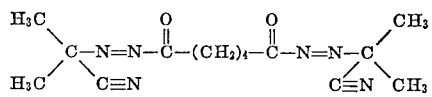

No polymerisation is obtained when using 1% of azo bis-(isobutyronitrile).

EXAMPLE 3

100 parts by weight of acrylamide are dissolved in 400 parts by volume of a mixture of methanol and water (25:15 parts by volume). When 1% by weight of acetyl-(2-cyanoisopropyl)-diazene, based on the monomer, is added, a practically 100% yield of a polymer of K-value 106, measured in water at 25° C., is obtained after 5 hours at −20° C., and a 100% yield of a polymer of K-value 121 and another of K-value 80 are obtained in the presence of 0.02 and 0.2 part by weight, respectively, of $CuSO_4 \cdot 5H_2O$. In the last mentioned case, polymerisation starts so vigorously after only a few minutes that the solution has solidified to a stiff gel after 5 minutes and it is only if small amounts of reaction mixture, of only a few ccs., are used that the heat of reaction can be removed sufficiently rapidly to prevent any significant rise in temperature. When using azo bis(isobutyronitrile) under these conditions, not the slightest trace of polymerisation is obtained in any case.

When 1% of acetyl-(2-cyanoisopropyl)diazene is used together with 1% of ammonium persulphate and 0.002% of $CuSO_4 \cdot 5H_2O$, based on the amount of monomer, the solution again gels within 5 minutes. The K-value of the polymer which has been worked up after 5 minutes is 74. Without the addition of copper sulphate, a polymer of K-value 102 is obtained in 100% yield after 5 hours. When using 1% of azo bis(isobutyronitrile) instead of acetyl-(2-cyanoisopropyl)diazene or when using ammonium persulphate alone, with or without copper sulphate, not the slightest amount of polymer is obtained under these conditions.

EXAMPLE 4

100 parts by weight of acrylonitrile are dissolved in 400 parts by volume of a mixture of methanol and water (volumetric ratio of 25:15) in the presence of 0.02 part by weight of $CuSO_4 \cdot 5H_2O$. When 1% by weight of acetyl-(2-cyanoisopropyl)-diazene, based on the monomer, is added, 11 parts by weight of a polymer which has a K-value of 106 measured at 25° C. in a 0.5% solution in dimethylformamide is obtained after 5 hours at −20° C.; when 1 part by weight of ammonium persulphate (based on acrylonitrile) and 0.002 parts by weight of CuSO₄·5H₂O are added, 48 parts by weight of a polymer of K-value 103 are obtained after 5 hours at —20° C., and without copper sulphate, 18 parts by weight of a polymer of K-value 104 are obtained. When using azo bis(isobutyronitrile) instead of acetyl-(2-cyanoisopropyl)diazene or when using ammonium persulphate alone under these conditions, however, not the smallest amount of polymer is obtained; the solutions remain completely clear.

EXAMPLE 5

100 parts by weight of vinylidene chloride are polymerised in a solution of 1 part by weight of hydroxymethylcellulose in 300 parts by volume of water with shaking in a thermostat at 30° C. for 20 hours in the presence of 2.5 parts by weight of acetyl-(2-cyanoisopropyl)-diazine. Polymerisation can be further accelerated by the addition of 0.2 part by weight of copper acetylacetonate so that a practically 100% yield is obtained.

EXAMPLE 6

100 parts by weight of styrene are polymerised in a solution of 5 parts by weight of lauryl alcohol sulphonate in 300 parts by volume of water in the presence of 2.5 parts by weight of acetyl-(2-cyanoisopropyl)-diazene with shaking in a thermostat at 30° C. for 19 hours.

EXAMPLE 7

100 parts by weight of acrylonitrile are dissolved in 400 parts by volume of a mixture of methanol and water (ratio by volume 25:15) in the presence of 0.2 part by weight of CuSO₄·5H₂O. After the addition of 2.5 parts by weight of acetyl-(carbethoxy)-diazene $$CH_3CO—N=N—COOC_2H_5$$

at —20° C., the solution becomes cloudy after 2 minutes, indicating that polymerisation has started. After 2 hours, the yield is 20%. The solution has solidified to a stiff gel.

EXAMPLE 8

100 parts by weight of acrylamide are dissolved in 400 parts by volume of a mixture of methanol and water (ratio by volume 25:15) in the presence of 0.2 part by weight of CuSO₄·5H₂O. After the addition of 2.5 parts by weight of acetyl-(2-cyanoisopropyl)-diazene, a practically 100% yield of polymer is obtained in less than 5 hours at —40° C.

EXAMPLE 9

90 parts by weight of acrylonitrile and 10 parts by weight of methyl acrylate are dissolved in 400 parts by volume of a mixture of methanol and water (ratio by volume 25:15) in the presence of 0.01 part by weight of FeSO₄·7H₂O and 0.01 part by weight of CuCl₂·2H₂O, 0.3 part by weight of acetic acid and 0.5 part by weight of potassium acetate, and 2.5 parts by weight of acetyl-(2-cyanoisopropyl)diazene are added at —40° C. A 35% yield of polymer is obtained after 5 hours.

EXAMPLE 10

100 parts by weight of acrylonitrile are dissolved in 400 parts by volume of a mixture of methanol and water (ratio by volume 25:15) in the presence of 0.2 part by weight of CuSO₄·5H₂O. After the addition of 2.5 parts by weight of acetyl-(2-cyanoisopropyl)-diazene at —20° C.

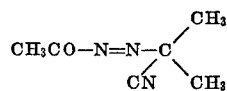

and 1 part by weight of dicyclohexylpercarbonate

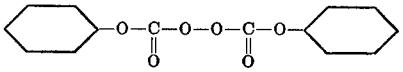

a polymer which has a K-value of 62 measured in a 0.5% solution of dimethylformamide at 25° C. is obtained in 70% yield after 5 hours, and when 0.5 part by weight of acetyl-(2-cyanoisopropyl)diazene are taken, a polymer of K-value 79 is obtained in 65% yield, and when 0.02 part by weight of CuSO₄·5H₂O, 2.5 parts by weight of acetyl-(2-cyanoisopropyl)diazene and 1 part by weight of dicyclohexylpercarbonate are added, a 64% yield of a polymer of K-value 84 is obtained under the same conditions.

EXAMPLE 11

95 parts by weight of acrylonitrile and 5 parts by weight of acrylamide are dissolved in the quantities of dimethylformamide and water indicated in the Table to form a 33% solution. In addition, the given quantities of CuCl₂·2H₂O and toluene sulphonic acid are added in the form of a solution in a part of the water which has been kept back, and polymerisation is carried out by the addition of 1 part by weight of dicyclohexylpercarbonate of the formula:

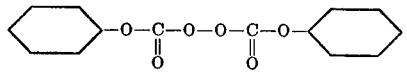

and 1 part by weight of acetyl-(2-cyanoisopropyl)diazene

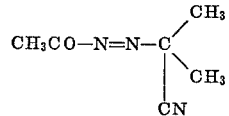

under conditions such that the temperature is kept constant at +20° C.

TABLE

| | | | | | | | | | | | | | | | |
|---|---|---|---|---|---|---|---|---|---|---|---|---|---|---|---|
| Dimethylformamide | 160 | 180 | 190 | 195 | 198 | 160 | 180 | 190 | 195 | 198 | 160 | 180 | 190 | 195 | 198 |
| Water | 40 | 20 | 10 | 5 | 2 | 40 | 20 | 10 | 5 | 2 | 40 | 20 | 10 | 5 | 2 |
| CuCl₂·2H₂O | 0.0005 | 0.0005 | 0.0005 | 0.0005 | 0.0005 | 0.0001 | 0.0001 | 0.0001 | 0.0001 | 0.0001 | 0.0001 | 0.0001 | 0.0001 | 0.0001 | 0.0001 |
| Toluene sulphonic acid | | | | | | | | | | | 1 | 1 | 1 | 1 | 1 |
| Percent yield after 19 hours | 95 | 80 | 100 | 100 | 90 | 92 | 88 | 90 | 95 | 83 | 90 | 40 | 38 | 46 | 100 |
| K-value | 86 | 75 | 65 | 74 | 82 | 99 | 76 | 78 | 81 | 86 | 135 | | | | 108 |

NOTE.—The K-value was determined in a 0.5% solution in dimethylformamide at 25° C.

We claim:
1. A process which comprises contacting an aliphatic or aromatic mono- or polyvinyl monomer with a catalytic amount of a catalyst comprising an acyl azo compound of the formula

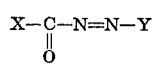

wherein (a) X is alkyl having 1 to 6 carbon atoms or phenyl and Y is

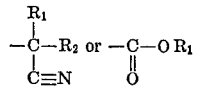

wherein R₁ and R₂ are each alkyl having 1 to 6 carbon atoms or together with the carbon atom to which they are attached form a cycloalkyl radical having 4 to 8 carbon atoms or (b) X is

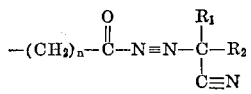

and Y is

wherein $R_1$ and $R_2$ are as aforesaid and $n$ is an integer from 1 to 8.

2. The process of claim 1 wherein said monomer is an acrylic or methacrylic acid ester.

3. The process of claim 1 wherein said contact is effected in a solvent which contains emulgated or dispersed monomer.

4. The process of claim 1 wherein said catalyst includes a compound of iron or copper.

5. The process of claim 1 wherein said catalyst includes ammonium persulfate.

References Cited

UNITED STATES PATENTS 3,418,294  12/1968  MacLeay et al. ____ 260—89.5 A
3,474,085  10/1969  MacLeay et al. _____ 260—89.5

HARRY WONG, JR., Primary Examiner

U.S. Cl. X.R.

252—426, 428, 429, 431; 260—63, 78.4, 78.5, 80, 80.3, 82.1, 85.5, 85.7, 86.1, 87.5, 87.7, 88.1, 88.7, 89.1, 89.7, 91.7, 92.3, 92.8, 93.5, 94.2, 192